United States Patent
Ferguson et al.

(10) Patent No.: US 10,754,346 B2
(45) Date of Patent: Aug. 25, 2020

(54) SYSTEM AND METHOD FOR PREVENTING DEPLETION OF A ROBOTIC ENERGY SOURCE

(71) Applicant: Fetch Robotics, Inc., San Jose, CA (US)

(72) Inventors: Michael Ferguson, San Jose, CA (US); Edward S. King, Alameda, CA (US)

(73) Assignee: Fetch Robotics, Inc., San Jose, CA (US)

( * ) Notice: Subject to any disclaimer, the term of this patent is extended or adjusted under 35 U.S.C. 154(b) by 318 days.

(21) Appl. No.: 15/911,104

(22) Filed: Mar. 3, 2018

(65) Prior Publication Data

US 2019/0270198 A1   Sep. 5, 2019

(51) Int. Cl.
*G05D 1/02* (2020.01)
*B25J 9/16* (2006.01)

(52) U.S. Cl.
CPC ............ *G05D 1/0225* (2013.01); *B25J 9/162* (2013.01); *G05D 1/0276* (2013.01); *G05D 1/0282* (2013.01); *G05D 1/0297* (2013.01); *Y10S 901/01* (2013.01)

(58) Field of Classification Search
CPC ....... B25J 9/162; B25J 9/0003; Y10S 901/01; A47L 2201/02; A47L 2201/022; G05D 1/0217; G05D 1/0225; G05D 1/0282; G05D 1/028; G05D 1/0297; G05D 1/0276; G05D 1/0285; G05D 2201/0203; G05D 2201/0206; G05D 2201/0204; G05D 2201/0208; G05D 2201/0211; G05D 2201/0215; G05D 2201/0216
See application file for complete search history.

(56) References Cited

U.S. PATENT DOCUMENTS

| | | | | |
|---|---|---|---|---|
| 8,736,228 | B1* | 5/2014 | Freed | H02J 7/0044 320/115 |
| 2014/0365258 | A1* | 12/2014 | Vestal | G06Q 10/063114 705/7.15 |
| 2018/0284735 | A1* | 10/2018 | Cella | G05B 23/0289 |
| 2019/0224852 | A1* | 7/2019 | Choi | B25J 9/1679 |
| 2019/0246626 | A1* | 8/2019 | Baughman | G05D 1/104 |

\* cited by examiner

*Primary Examiner* — Spencer D Patton
(74) *Attorney, Agent, or Firm* — J. Steven Svoboda

(57) ABSTRACT

A system to prevent depletion of a robotic energy source includes: a mobile robot; a server operably connected to the robot via a communication system, the server configured to manage the robot; a robotic energy source configured to provide energy to the robot; a controller operably connected to the robot, the controller operably connected to the server, the controller configured to control the robot, the controller further configured to monitor an energy level of the robot; and a charging station configured to operably connect to the energy source, the charging station further configured to replenish the energy source.

17 Claims, 6 Drawing Sheets

SYSTEM AND METHOD FOR PREVENTING DEPLETION OF A ROBOTIC ENERGY SOURCE

SUMMARY

Embodiments of the invention relate in general to a system and method for preventing depletion of a robotic energy source. Further embodiments of the invention relate in general to a system and method for preventing robotic discharge.

A system to prevent depletion of a robotic energy source includes: a mobile robot; a server operably connected to the robot via a communication system, the server configured to manage the robot, the server further configured to monitor an energy level of the robot for a sign of low energy, wherein the low-energy sign comprises one or more of a measured energy level below a critical energy level and a critical disruption of the communication system, the server further configured to send a robot that shows a low-energy sign a replenishment message ordering the robot to do one or more of replenish its energy source, reduce its activity, and shut down; a controller operably connected to the robot, the controller operably connected to the server, the controller configured to control the robot, the controller further configured to monitor a status of the communication system for the critical disruption; a robotic energy source configured to provide energy to the robot; and a charging station configured to operably connect to the energy source, the charging station further configured to replenish the energy source.

A method to prevent depletion of a robotic energy source includes: monitoring, by a server operably connected to a mobile robot via a communication system, the server configured to manage the robot, an energy level of an energy source configured to provide energy to the robot; finding, by the server, a critical energy level comprising an energy level at which replenishment of the energy source begins; determining, by the server, a low-energy sign indicating that the robot has low energy, the low-energy sign comprising one or more of a measured energy level below the critical energy level and a critical disruption of the communication system; allowing, by the server, monitoring, by a controller operably connected to the robot, the controller operably connected to the server, of a status of the communication system for the critical disruption, the controller configured to control the robot, the controller further configured to monitor an energy level of the robot; deciding, by the server, based on the critical energy level, to send a replenishment message ordering the robot to do one or more of replenish its energy source, reduce its activity, and shut down; and sending, by the server, the replenishment message to the controller.

A method to prevent depletion of a robotic energy source includes: monitoring, by a controller operably connected to a mobile robot, the controller configured to control the robot, an energy level of an energy source configured to provide energy to the robot; receiving, by the controller, a critical energy level comprising an energy level at which replenishment of the energy source begins; receiving, by the controller, from a server operably connected to the controller, the server operably connected to the robot via a communication system, the server configured to manage the robot, a low-energy sign indicating that the robot has low energy, the low-energy sign comprising one or more of a measured energy level below the critical energy level and a critical disruption of the communication system; monitoring, by the controller, a status of the communication system for the critical disruption; deciding, by the controller, based on the critical energy level, to send, a replenishment message ordering the robot to do one or more of replenish its energy source, reduce its activity, and shut down; and sending, by the controller, to the robot, the replenishment message.

A method to prevent depletion of a robotic energy source includes: monitoring, by a controller operably connected to a mobile robot, the controller configured to control the robot, an energy level of an energy source configured to provide energy to the robot; determining, by the controller, a critical energy level comprising an energy level at which replenishment of the energy source begins; determining, by the controller, a low-energy sign indicating that the robot has low energy, the low-energy sign comprising one or more of a measured energy level below the critical energy level and a critical disruption of the communication system; monitoring, by the controller, a status of the communication system for the critical disruption; deciding by the controller, based on the critical energy level, to send a replenishment message ordering the robot to do one or more of replenish its energy source, reduce its activity, and shut down; and sending, by the controller, to the robot, the replenishment message.

A system to prevent depletion of a robotic energy source includes: a mobile robot; a server operably connected to the robot via a communication system, the server configured to manage the robot; a robotic energy source configured to provide energy to the robot; a controller operably connected to the robot, the controller operably connected to the server, the controller configured to control the robot, the controller further configured to monitor an energy level of the robot; and a charging station configured to operably connect to the energy source, the charging station further configured to replenish the energy source.

A method to prevent depletion of a robotic energy source includes: monitoring, by a server operably connected to a mobile robot via a communication system, the server configured to manage the robot, an energy level of an energy source configured to provide energy to the robot; finding, by the server, a critical energy level comprising an energy level at which replenishment of the energy source begins; determining, by the server, based on the critical energy level, that the robot's energy level is less than the critical energy level; and sending, by the server, a replenishment message to a controller operably connected to the robot, the controller operably connected to the server, the controller configured to control the robot, the controller further configured to monitor an energy level of the robot, the replenishment message ordering the robot's energy source to be replenished.

A method to prevent depletion of a robotic energy source includes: monitoring, by a controller operably connected to a mobile robot, the controller configured to control the robot, an energy level of an energy source configured to provide energy to the robot; receiving, by the controller, a critical energy level comprising an energy level at which replenishment of the energy source begins; receiving, by the controller, from a server operably connected to the controller, the server operably connected to the robot via a communication system, the server configured to manage the robot, a determination that the robot's energy level is less than the critical energy level; receiving, by the controller, from the server, a replenishment message ordering the robot's energy source to be replenished; and sending, by the controller, to the robot, the replenishment message.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

DETAILED DESCRIPTION

Figure 1:
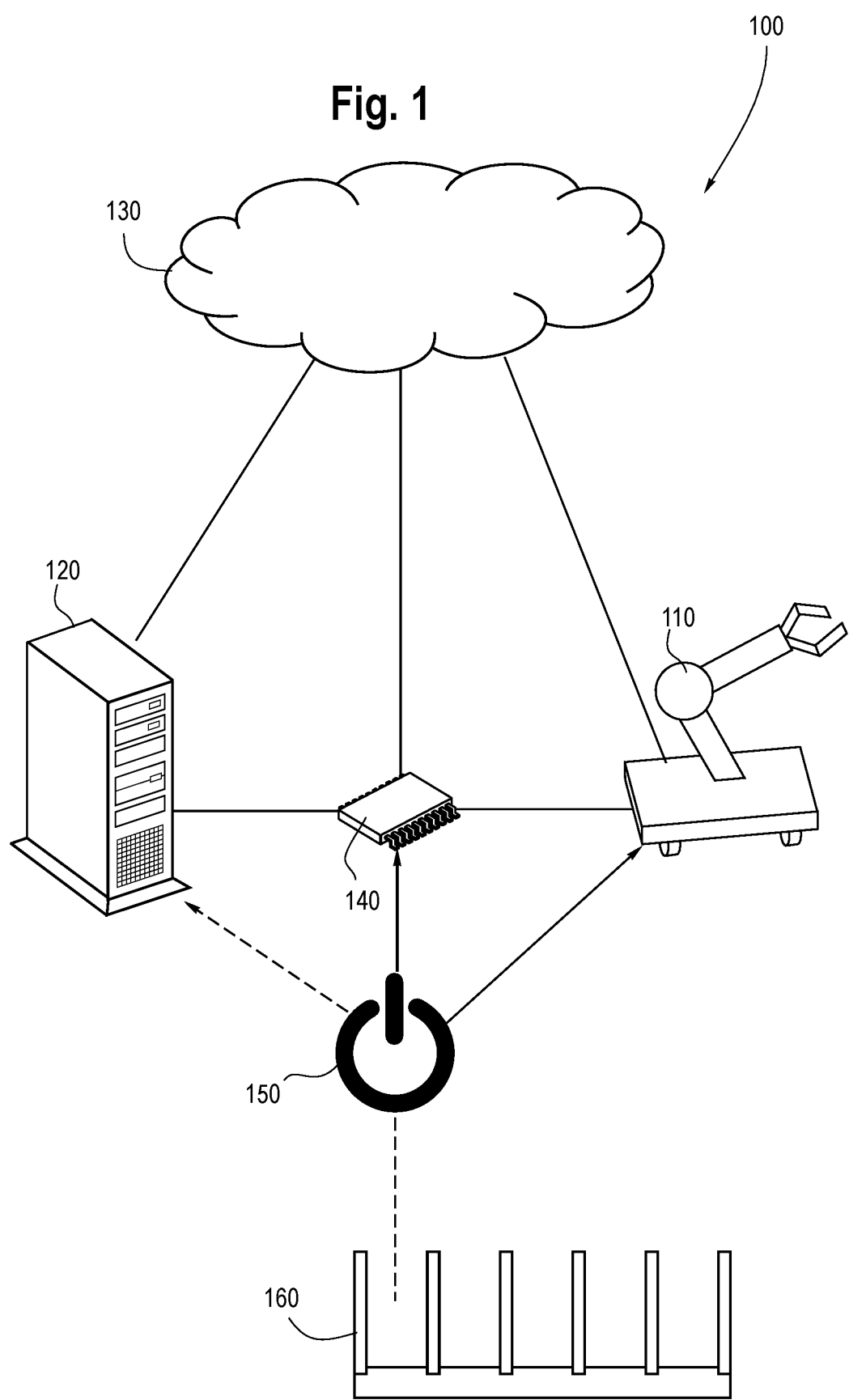
FIG. 1 is a diagram showing components of a system for preventing depletion of a robotic energy source.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

Embodiments of the invention relate in general to a system and method for preventing depletion of a robotic energy source. Further embodiments of the invention relate in general to a system and method for preventing robotic discharge.

The system and method for preventing depletion of a robotic energy source includes a plurality of components such as one or more of electronic components, hardware components, and computer software components. A number of such components can be combined or divided in the system. An example component of the system includes a set and/or series of computer instructions written in or implemented with any of a number of programming languages, as will be appreciated by those skilled in the art.

The system in one example employs one or more computer-readable signal-bearing media. The computer-readable signal bearing media store software, firmware and/or assembly language for performing one or more portions of one or more implementations of the invention. The computer-readable signal-bearing medium for the system in one example comprises one or more of a magnetic, electrical, optical, biological, and atomic data storage medium. For example, the computer-readable signal-bearing medium comprises floppy disks, magnetic tapes, CD-ROMs, DVD-ROMs, hard disk drives, downloadable files, files executable "in the cloud," and electronic memory.

For example, the system comprises one or more of a mobile platform and an online platform. Embodiments of the invention employ a computational device. For example, the computational device comprises one or more of a computer, a mobile phone, a tablet, and another computational device.

A system to prevent depletion of a robotic energy source comprises a robot. Preferably, although not necessarily, the system to prevent depletion of a robotic energy source comprises a mobile robot. For example, the mobile robot is operably connected to a server. Preferably, although not necessarily, the server comprises a fleet management server.

Preferably, the fleet management server is configured to manage one or more of workflows and work assignments for the robots. Preferably, although not necessarily, the fleet management server is configured to optimize multiple workflows. Preferably, although not necessarily, the fleet management server is configured to optimize multiple simultaneous workflows. Preferably, although not necessarily, the fleet management server is configured to optimize multiple temporally contiguous workflows. For example, the fleet management server might manage one or more large assignments lasting months and requiring many robots, along with numerous shorter-term assignments happening during part of the time the large assignment is being fulfilled.

Preferably, although not necessarily, the fleet management server comprises a central point of provisioning of the robots. Preferably, although not necessarily, the fleet management server comprises a central point of authentication for the robots. Preferably, although not necessarily, the fleet management server comprises a central point of coordination and work optimization for one or more of the robots and other automated equipment. For example, the fleet management server comprises a Warehouse Management System (WMS). For example, the automated equipment comprises one or more of a conveyor, a door, an elevator, a lift, and another type of automated equipment. Preferably, although not necessarily, the fleet management server serves as a central point of integration with other systems.

Preferably, although not necessarily, the mobile robot is operably connected to the server through a communication system. Preferably, although not necessarily, the mobile robot is operably connected to the server through a wireless communication system.

According to further embodiments of the invention, the mobile robot comprises a controller configured to control the robot. For example, the robotic controller is located outside the robot. For example, the mobile robot comprises a controller that is operably connected to an energy source. For example, the controller is located outside the robot. For example, the controller is located inside the robot.

For example, the energy source comprises one or more of a battery, a gasoline powered engine, a diesel-powered engine, a fuel cell, a fusion system, a fission system, and another energy source subject to depletion over time. Alternatively, or additionally, the energy source is substantially unlimited. For example, the energy source requires periodic cleaning, in which cases embodiments of the present invention are also useful even if the energy source is substantially unlimited. For instance, fuel cells need to be cleaned to prevent buildup of residue. For example, the energy source is located outside the robot. For example, the energy source is located inside the robot.

In this application, charging station is used generally to refer to any location, apparatus, or other method or instrumentality that can increase an energy level of a robot. For example, the charging station replenishes the energy source. For example, a charging station comprises a location where a battery-operated robot can increase the charge on the battery. For example, a charging station replaces a used robotic battery with a fresh battery. For example, a charging station replenishes robotic energy using one or more of battery charging, battery replacement, electricity, solar power, wind power, geothermal power, and another form of energy. For example, a charging station comprises a maintenance station configured to perform needed periodic maintenance of one or more of the robot and the energy source.

For example, the periodic maintenance comprises one or more of cleaning of the energy source, cleaning of the robot, and another form of periodic maintenance.

According to embodiments of the invention, the controller monitors an energy level of the robot. The controller also monitors a status of the communication system. For example, the controller monitors the status of the communication system for one or more of loss of connection, reduction of connection, and connectivity.

According to additional embodiments of the invention, the server monitors an energy level of the robot. Alternatively, or additionally, the server determines if the robot's energy level is greater than a critical energy level. For example, the critical energy level is defined as an energy level at which it is desirable that a robot energy level be replenished.

For example, the critical energy level is pre-determined by a user. For example, the server determines the critical energy level. For example, the server computes the critical energy level. For example, the server uses an algorithm to determine the critical energy level. For example, the server determines the critical energy level in another manner.

According to further embodiments of the invention, the server sends a replenishment message. According to other embodiments of the invention, the replenishment message comprises an instruction ordering the robot to do one or more of replenish its energy source, reduce its activity, and shut down. According to other embodiments of the invention, the replenishment message comprises an instruction to the controller to order the robot to do one or more of replenish its energy source, reduce its activity, and shut down. For example, the server sends the replenishment message when the robot's energy level reaches the critical energy level. For example, the server sends the replenishment message to the charging station.

Alternatively, or additionally, the server sends the replenishment message to the robot. Alternatively, or additionally, the server sends the replenishment message to the server. Alternatively, or additionally, the server determines a charging station to which the replenishment message sends the robot. Alternatively, or additionally, the server sends the replenishment message to the charging station. Alternatively, or additionally, the server sends the replenishment message to a user. Alternatively, or additionally, the server sends the replenishment message to a user in a position to assist the robot in charging. Alternatively, or additionally, the server sends the replenishment message to a second robot in a position to assist the mobile robot in charging. For example, assisting the mobile robot in charging comprises one or more of assisting the robot to reach the charging station, and assisting the robot in the charging process. For example, the second robot has no pending tasks. For example, the second robot has no urgent pending tasks. For example, the second robot is located near the mobile robot. For example, the second robot is in a position to assist the mobile robot in charging for another reason.

According to further embodiments of the invention, when the server determines that the robot's energy level is less than the critical energy level, the server issues the replenishment message.

Alternatively, or additionally, the controller determines if the robot's energy level is greater than the critical energy level. Alternatively, or additionally, the controller determines the critical energy level. Alternatively, or additionally, the controller computes the critical energy level. For example, the controller uses an algorithm to determine the critical energy level.

According to further embodiments of the invention, the controller sends the replenishment message. For example, the controller sends the replenishment message when the robot's energy level is less than the critical energy level. For example, the controller determines a charging station to which the replenishment message sends the robot. For example, the controller transmits the replenishment message to the charging station.

Alternatively, or additionally, the controller sends the replenishment message to the robot. Alternatively, or additionally, the controller sends the replenishment message to the user. Alternatively, or additionally, the controller sends the replenishment message to the one or more other robots.

According to further embodiments of the invention, when the controller determines that the critical energy level has been reached, the controller issues the replenishment message.

According to further embodiments of the invention, the server is configured, upon sending the replenishment message to the robot, to further instruct the robot to move itself to an assigned charging station. According to still other embodiments of the invention, the server is configured, upon instructing the robot to move itself to the charging station, to further instruct the robot to replenish its energy at the charging station.

According to other embodiments of the invention, the server is configured to instruct a robot that shows a sign of low energy to reduce its activity. For example, the server is configured to instruct the low-energy robot to shut down. For example, the instruction to the robot to shut down preserves remaining robot energy. For example, the instruction to the robot to shut down prevents the robot from becoming critically low on energy. For example, the server instructs the low-energy robot by sending a low-energy message to the controller.

For example, a low-energy sign comprises one or more of a measured energy level below the critical energy level and a critical disruption of the communication system. For example, the critical disruption of the communication system comprises one or more of a disconnection for at least an allowed connection downtime, a reduction of communication for at least the allowed connection downtime, and another critical disruption of communication. For example, the critical disruption of the communication system may be pre-determined by a user. For example, the server determines the critical disruption. For example, the server uses an algorithm to determine the critical disruption.

For example, the mobile robot comprises one or more wheels. For example, the mobile robot comprises two or more wheels. For example, the mobile robot comprises mobility hardware other than wheels. For example, the mobility hardware comprises a motor. For example, the mobile robot comprises a differential drive. For example, the mobile robot comprises a plurality of legs configured to move the robot. For example, the mobility hardware comprises a motor configured to fly the robot. For example, the mobility hardware comprises a motor configured to move the robot through water. For example, the mobile robot comprises an underwater robot.

For example, the server is one or more of physically located within the facility that the robot operates and based in the cloud, or resides on a robot. For example, the server comprises a personal computer.

Typically, although not necessarily, the robot communicates with the server using a wireless communication system. For example, the communication system to transmit information from the robot to the server uses one or more of Wifi, Bluetooth, Zigbee, and another wireless communication system.

The robot might operate in any of a number of environments. For instance, the robot is located in a warehouse. For instance, the robot is assisting pickers in a warehouse. For instance, the robot is moving pallets through a warehouse. For instance, the robot is located in a manufacturing facility. For instance, the robot moves finished goods in a manufacturing facility. For instance, the robot is located outdoors. For instance, the robot picks crops outdoors.

Setting the pre-determined critical energy level at which the robot shuts down is an important aspect of the invention. If the level is too high, then the effectiveness of the robot fleet will be diminished. If the level is too low, the robot might not have enough power left to be moved to a charging station. Additionally, many power sources may continue to discharge slightly over time even after the load has been removed. In this case, an additional amount of reserve may be required. The proper setting can be determined by testing the amount of energy required.

Similarly important is setting the allowed connection downtime for which connection can be disconnected or diminished. For instance, in a warehouse in a remote, rural location, the network connectivity may experience intermittent connection downtime, sometimes several minutes at a time. For instance, the allowed connection downtime in a rural setting is 60 minutes. For instance, the pre-determined allowed connection downtime in a robust environment is 10 minutes. For example, the allowed connection downtime is pre-determined by a user. For example, the server determines the allowed connection downtime. For example, the server computes the allowed connection downtime. For example, the server uses an algorithm to determine the allowed connection downtime. For example, the server determines the allowed connection downtime in another manner.

In one embodiment, the amount of allowed connection downtime is related to the energy level. For instance, a lower energy level requires a lower allowed connection downtime before the shutdown occurs. For instance, at a critically low energy level, the robot will commence shut down even while the network connection is functional.

FIG. 1 is a diagram showing components of a system 100 for preventing depletion of a robotic energy source.

The system 100 comprises a mobile robot 110. The system 100 further comprises a server 120 operably connected to the robot 110 via a communication system 130. The server 120 is configured to manage the robot 110. Preferably, although not necessarily, the communication system 130 comprises a wireless communication system 130. For example, the communication system 130 comprises one or more of Wifi, Bluetooth, Zigbee, and another wireless communication system 130.

The system 100 further comprises a controller 140 that is configured to control the robot 110. The controller 140 is operably connected to the robot 110. The controller is also operably connected to the server 120.

The system 100 further comprises a robotic energy source 150 configured to provide energy to the robot 110. The energy source 150 may optionally be monitored by the server 120. The controller 140 is further configured to monitor an energy level of the energy source 150, which also comprises the energy level of the robot 110.

The energy source 150 comprises one or more of a battery, a gasoline powered engine, a diesel-powered engine, a fuel cell, a fusion system, a fission system, and another energy source 150. The energy source 150 may be subject to depletion over time. Alternatively, or additionally, the energy source 150 is unlimited. For example, the energy source 150 requires periodic cleaning. Typically, although not necessarily, the energy source 150 is located inside the robot 110. Alternatively, the energy source 150 is located outside the robot 110.

The system further comprises a charging station 160 configured to operably connect to the energy source 150. The charging station 160 is further configured to replenish the energy source. The terminology "charging station 160" is used for convenience and does not necessarily mean that literally charging of the robot 110 necessarily happens at the charging station 160. In this application, charging station 160 is used generally to refer to any location, apparatus, or other method or instrumentality that can increase an energy level of the robot 110. For example, the charging station 160 replenishes the energy source 150. For example, the charging station 160 comprises a location where a battery-operated robot 110 can increase the charge on the battery. For example, the charging station 160 replaces a used robotic battery with a fresh battery. For example, the charging station 160 replenishes robotic energy using one or more of battery charging, battery replacement, electricity, solar power, wind power, geothermal power, and another form of energy.

Figure 2:
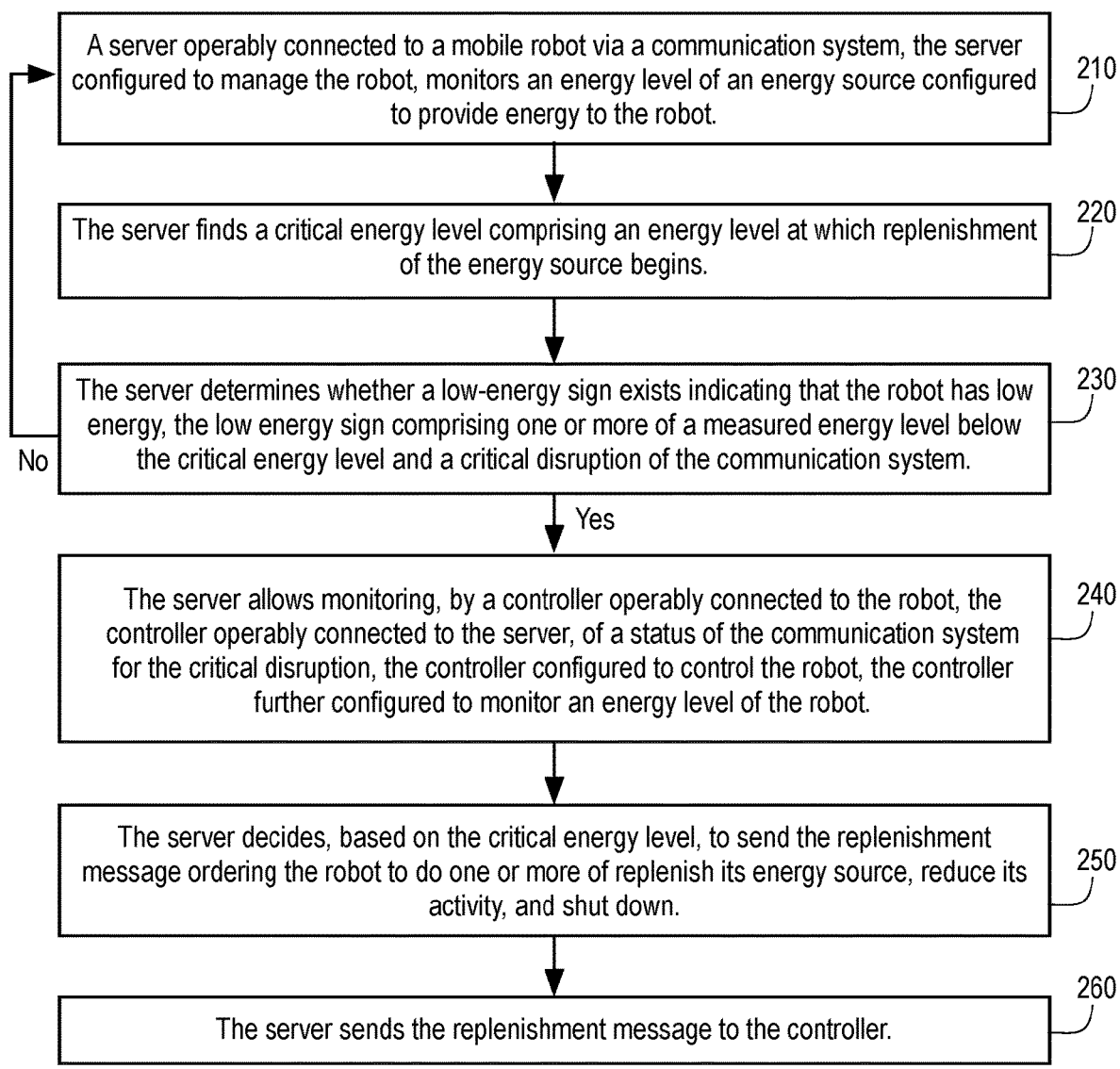
FIG. 2 is a flow chart of a method for preventing depletion of a robotic energy source.

FIG. 2 is a flow chart of a method 200 for preventing depletion of a robotic energy source.

The order of the steps in the method 200 is not constrained to that shown in FIG. 2 or described in the following discussion. Several of the steps could occur in a different order without affecting the final result.

In step 210, a server operably connected to a mobile robot via a communication system, the server configured to manage the robot, monitors an energy level of an energy source configured to provide energy to the robot. Block 210 then transfers control to block 220.

In step 220, the server finds a critical energy level comprising an energy level at which replenishment of the energy source begins. For example, finding comprises receiving the critical energy level from a user. For example, finding comprises computing the critical energy level by the server. Block 220 then transfers control to block 230.

In step 230, the server determines whether a low-energy sign exists indicating that the robot has low energy, the low-energy sign comprising one or more of a measured energy level below the critical energy level and a critical disruption of the communication system. If no, the process loops back to step 210. If yes, block 230 transfers control to block 240.

In step 240, the server allows monitoring, by a controller operably connected to the robot, the controller operably connected to the server, of a status of the communication system for the critical disruption, the controller configured to control the robot, the controller further configured to monitor an energy level of the robot. Block 240 then transfers control to block 250.

In step 250, the server decides, based on the critical energy level, to send a replenishment message ordering the robot to do one or more of replenish its energy source, reduce its activity, and shut down. Block 250 the transfers control to block 260.

In step 260, the server sends the replenishment message to the controller. Block 260 then terminates the process.

Figure 3:
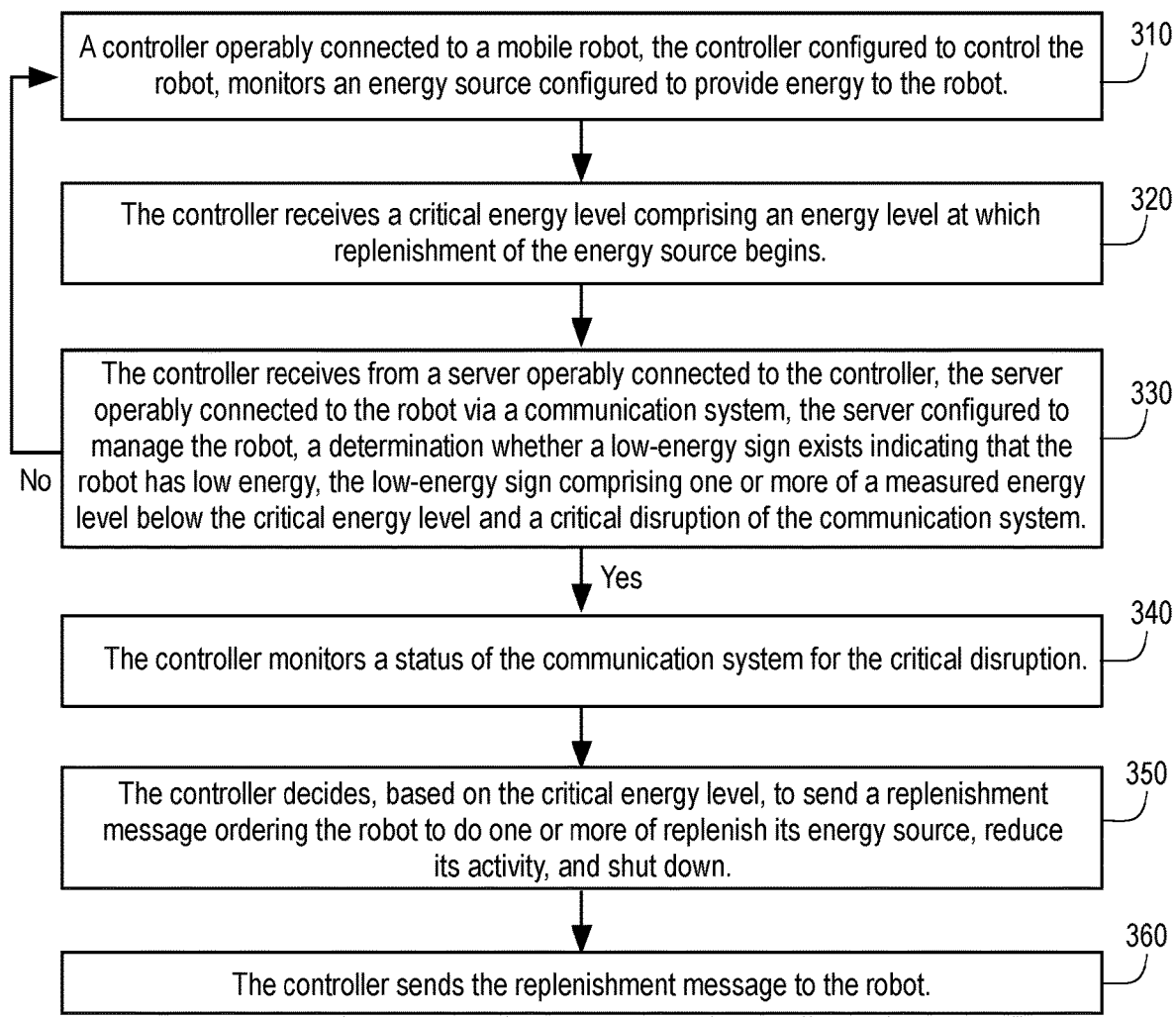
FIG. 3 is a flow chart of a method for preventing depletion of a robotic energy source.

FIG. 3 is a flow chart of a method 300 for preventing depletion of a robotic energy source.

The order of the steps in the method 300 is not constrained to that shown in FIG. 3 or described in the following discussion. Several of the steps could occur in a different order without affecting the final result.

In step 310, a controller operably connected to a mobile robot, the controller configured to control the robot, monitors an energy level of an energy source configured to provide energy to the robot. Block 310 then transfers control to block 320.

In step 320, the controller receives a critical energy level comprising an energy level at which replenishment of the energy source begins. For example, the controller receives the critical energy level from a user. For example, the controller receives the critical energy level from the server. For example, this step comprises a sub-step of the controller determining the critical energy level. Block 320 then transfers control to block 330.

In step 330, the controller receives from a server operably connected to the controller, the server operably connected to the robot via a communication system, the server configured to manage the robot, a determination whether a low-energy sign exists indicating that the robot has low energy, the low-energy sign comprising one or more of a measured energy level below the critical energy level and a critical disruption of the communication system. If no, the process loops back to step 310. If yes, block 330 transfers control to block 340.

In step 340, the controller monitors a status of the communication system for the critical disruption. Block 340 then transfer control to block 350.

In step 350, the controller decides, based on the critical energy level, to send, a replenishment message ordering the robot to do one or more of replenish its energy source, reduce its activity, and shut down. Block 350 then transfers control to block 360.

In step 360, the controller sends the replenishment message to the robot. Block 360 then terminates the process.

The method optionally includes an additional step of the controller transmitting the replenishment method to a charging station configured to replenish the energy source. The method optionally includes an additional step of the controller transmitting the replenishment message to a user. The method optionally includes an additional step of the controller transmitting the replenishment message to a second robot in a position to assist the mobile robot in charging.

The method optionally includes an additional step, performed after the step of receiving the replenishment message and before the sending step, of determining, by the controller, a charging station to which the replenishment message sends the robot.

The method optionally includes an additional step of the controller instructing the robot to move itself to the charging station. This method optionally includes an additional step, performed after the step of instructing the robot to move itself to the charging station, of the controller further instructing the robot to replenish its energy at the charging station.

Figure 4:
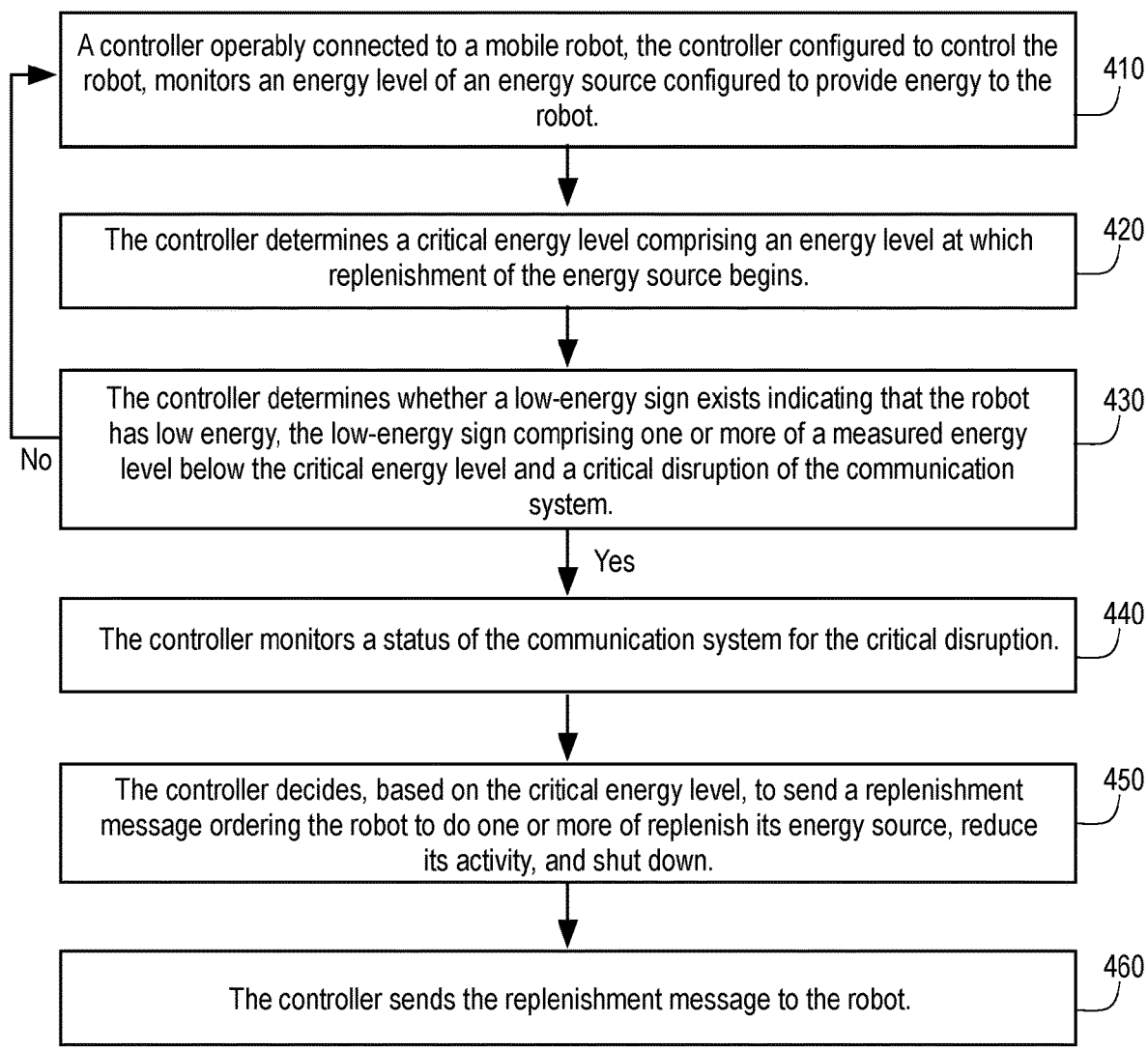
FIG. 4 is a flow chart of a method for preventing depletion of a robotic energy source.

FIG. 4 is a flow chart of a method 400 for preventing depletion of a robotic energy source.

The order of the steps in the method 400 is not constrained to that shown in FIG. 4 or described in the following discussion. Several of the steps could occur in a different order without affecting the final result.

In step 410, a controller operably connected to a mobile robot, the controller configured to control the robot, monitors an energy level of an energy source configured to provide energy to the robot. Block 410 then transfers control to block 420.

In step 420, the controller determines a critical energy level comprising an energy level at which replenishment of the energy source begins. This step optionally includes determining a critical energy level different from a critical energy level determined by the server. Block 420 then transfers control to block 430.

In step 430, the controller determines whether a low-energy sign exists indicating that the robot has low energy, the low-energy sign comprising one or more of a measured energy level below the critical energy level and a critical disruption of the communication system. If no, the process loops back to step 410. If yes, block 430 transfers control to block 440.

In block 440, the controller monitors a status of the communication system for the critical disruption. Block 440 then transfer control to block 450.

In step 450, the controller decides, based on the critical energy level, to send a replenishment message ordering the robot to do one or more of replenish its energy source, reduce its activity, and shut down. Block 450 then transfers control to block 460.

In step 460, the controller sends the replenishment message to the robot. Block 460 then terminates the process.

Figure 5:
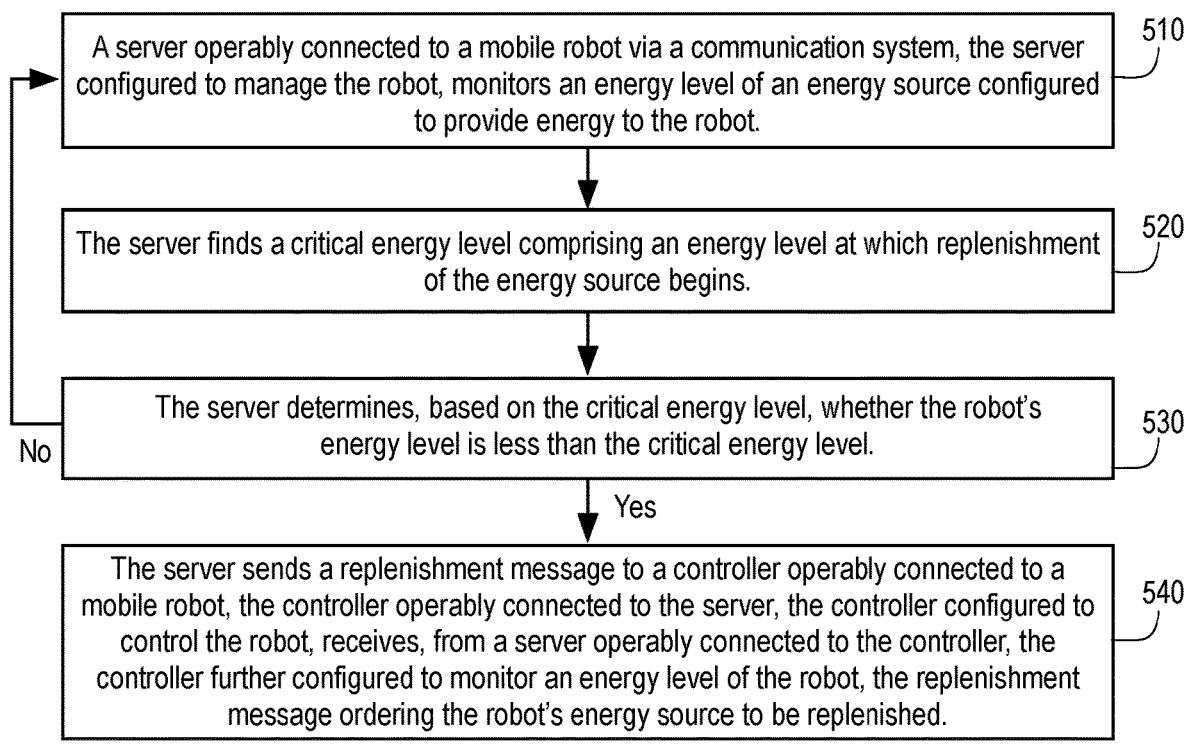
FIG. 5 is a flow chart of a method for preventing depletion of a robotic energy source.

FIG. 5 is a flow chart of a method 500 for preventing depletion of a robotic energy source.

The order of the steps in the method 500 is not constrained to that shown in FIG. 5 or described in the following discussion. Several of the steps could occur in a different order without affecting the final result.

In step 510, a server operably connected to a mobile robot via a communication system, the server configured to manage the robot, monitors an energy level of an energy source configured to provide energy to the robot. Block 510 then transfers control to block 520.

In step 520, the server finds a critical energy level comprising an energy level at which replenishment of the energy source begins. For example, finding comprises receiving the critical energy level from a user. For example, finding comprises computing the critical energy level by the server. Block 520 then transfers control to block 530.

In step 530, the server determines, based on the critical energy level, whether the robot's energy level is less than the critical energy level. If no, the process loops back to step 510. If yes, block 530 transfers control to block 540.

In step 540, the server sends a replenishment message to a controller operably connected to a mobile robot, the controller operably connected to the server, the controller configured to control the robot, receives, from a server operably connected to the controller, the controller further configured to monitor an energy level of the robot, the replenishment message ordering the robot's energy source to be replenished. Block 540 then terminates the process.

Figure 6:
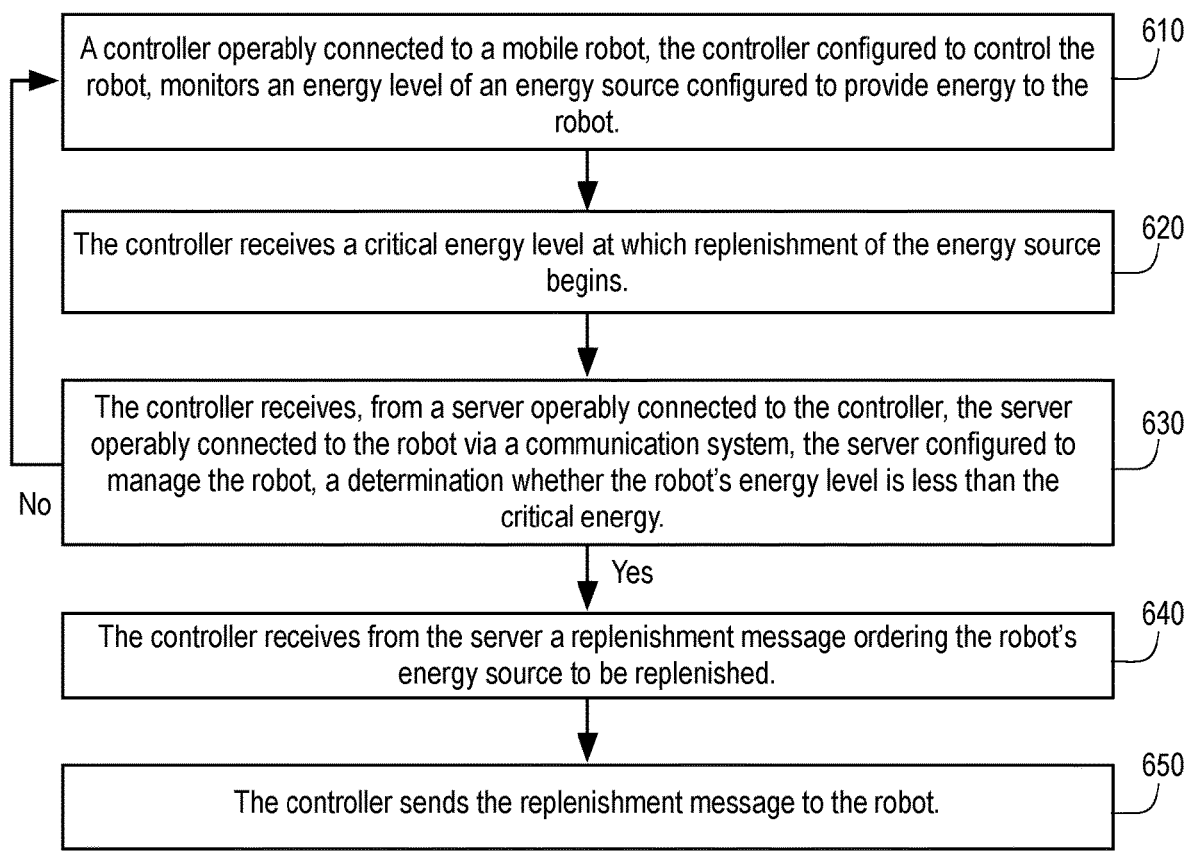
FIG. 6 is a flow chart of a method for preventing depletion of a robotic energy source.

FIG. 6 is a flow chart of a method 600 for preventing depletion of a robotic energy source.

The order of the steps in the method 600 is not constrained to that shown in FIG. 6 or described in the following discussion. Several of the steps could occur in a different order without affecting the final result.

In step 610, a controller operably connected to a mobile robot, the controller configured to control the robot, monitors an energy level of an energy source configured to provide energy to the robot. Block 610 then transfers control to block 620.

In step 620, the controller receives a critical energy level comprising an energy level at which replenishment of the energy source begins. Block 620 then transfers control to block 630.

In step 630, the controller receives, from a server operably connected to the controller, the server operably connected to the robot via a communication system, the server configured to manage the robot, a determination whether the robot's energy level is less than the critical energy level. If no, the process loops back to step 610. If yes, block 630 transfers control to block 640.

In step 640, the controller receives from the server a replenishment message ordering the robot's energy source to be replenished. Block 640 then transfers control to block 650.

In step 650, the controller sends the replenishment message to the robot. Block 650 then terminates the process.

Advantages of the invention include enabling robust and agile avoidance of situations in which one or more of robotic braking mechanisms, robotic size, and robotic mass make it difficult or impossible for a human operator to safely move a robot that has extinguished its energy. Further advantages of the invention include facilitating an inexpensive, efficient shutdown of part or all of a robot, preserving remaining energy and preventing a situation where the robot is critically low on energy.

For example, it will be understood by those skilled in the art that software used by the system and method for preventing depletion of a robotic energy source may be located in any location in which it may be accessed by the system. It will be further understood by those of skill in the art that the number of variations of the network, location of the software, and the like are virtually limitless. It is intended, therefore, that the subject matter in the above description shall be interpreted as illustrative and shall not be interpreted in a limiting sense.

For example, embodiments of the invention could operate on a wide range of devices other than mobile phones, tablets, and computers without substantially affecting the functioning of embodiments of the invention.

While the above representative embodiments have been described with certain components in exemplary configurations, it will be understood by one of ordinary skill in the art that other representative embodiments can be implemented using different configurations and/or different components.

For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A system to prevent depletion of a robotic energy source, comprising:
   a mobile robot;
   a server operably connected to the robot via a communication system, the server configured to manage the robot, the server further configured to monitor an energy level of the robot for a sign of low energy, wherein the low-energy sign comprises a critical disruption of the communication system, the server further configured to send a robot that shows the low-energy sign a replenishment message ordering the robot to do one or more of reduce its activity and shut down;
   a controller operably connected to the robot, the controller operably connected to the server, the controller configured to control the robot, the controller further configured to monitor a status of the communication system for the critical disruption, the controller located inside the robot;
   a robotic energy source configured to provide energy to the robot; and
   a charging station configured to operably connect to the energy source, the charging station further configured to replenish the energy source,
   wherein the server sends the replenishment message to the charging station.

2. A system to prevent depletion of a robotic energy source, comprising:
   a mobile robot;
   a server operably connected to the robot via a communication system, the server configured to manage the robot, the server further configured to monitor an energy level of the robot for a sign of low energy, wherein the low-energy sign comprises a critical disruption of the communication system, the server further configured to send a robot that shows the low-energy sign a replenishment message ordering the robot to do one or more of reduce its activity and shut down;
   a controller operably connected to the robot, the controller operably connected to the server, the controller configured to control the robot, the controller further configured to monitor a status of the communication system for the critical disruption, the controller located inside the robot;
   a robotic energy source configured to provide energy to the robot; and
   a charging station configured to operably connect to the energy source, the charging station further configured to replenish the energy source,
   wherein the server sends the replenishment message to a user.

3. A system to prevent depletion of a robotic energy source, comprising:
   a mobile robot;
   a server operably connected to the robot via a communication system, the server configured to manage the robot, the server further configured to monitor an energy level of the robot for a sign of low energy, wherein the low-energy sign comprises a critical disruption of the communication system, the server further configured to send a robot that shows the low-energy sign a replenishment message ordering the robot to do one or more of reduce its activity and shut down;
   a controller operably connected to the robot, the controller operably connected to the server, the controller configured to control the robot, the controller further configured to monitor a status of the communication system for the critical disruption, the controller located inside the robot;
   a robotic energy source configured to provide energy to the robot; and
   a charging station configured to operably connect to the energy source, the charging station further configured to replenish the energy source, wherein the server sends the replenishment message to a second robot in a position to assist the mobile robot in charging.

4. A system to prevent depletion of a robotic energy source, comprising:
a mobile robot;
a server operably connected to the robot via a communication system, the server configured to manage the robot, the server further configured to monitor an energy level of the robot for a sign of low energy, wherein the low-energy sign comprises a critical disruption of the communication system, the server further configured to send a robot that shows the low-energy sign a replenishment message ordering the robot to do one or more of reduce its activity and shut down;
a controller operably connected to the robot, the controller operably connected to the server, the controller configured to control the robot, the controller further configured to monitor a status of the communication system for the critical disruption, the controller located inside the robot;
a robotic energy source configured to provide energy to the robot; and
a charging station configured to operably connect to the energy source, the charging station further configured to replenish the energy source,
wherein the controller is further configured to determine if the robot's energy level is less than the critical energy level,
wherein the controller is further configured, upon determining that the robot's energy level is less than the critical energy level, to send the replenishment message,
wherein the controller sends the replenishment message to the robot,
wherein the controller determines a charging station to which the replenishment message sends the robot.

5. A system to prevent depletion of a robotic energy source, comprising:
a mobile robot;
a server operably connected to the robot via a communication system, the server configured to manage the robot, the server further configured to monitor an energy level of the robot for a sign of low energy, wherein the low-energy sign comprises a critical disruption of the communication system, the server further configured to send a robot that shows the low-energy sign a replenishment message ordering the robot to do one or more of reduce its activity and shut down;
a controller operably connected to the robot, the controller operably connected to the server, the controller configured to control the robot, the controller further configured to monitor a status of the communication system for the critical disruption, the controller located inside the robot;
a robotic energy source configured to provide energy to the robot; and
a charging station configured to operably connect to the energy source, the charging station further configured to replenish the energy source,
wherein the controller is further configured to determine if the robot's energy level is less than the critical energy level,
wherein the controller is further configured, upon determining that the robot's energy level is less than the critical energy level, to send the replenishment message,
wherein the controller sends the replenishment message to the charging station.

6. A system to prevent depletion of a robotic energy source, comprising:
a mobile robot;
a server operably connected to the robot via a communication system, the server configured to manage the robot, the server further configured to monitor an energy level of the robot for a sign of low energy, wherein the low-energy sign comprises a critical disruption of the communication system, the server further configured to send a robot that shows the low-energy sign a replenishment message ordering the robot to do one or more of reduce its activity and shut down;
a controller operably connected to the robot, the controller operably connected to the server, the controller configured to control the robot, the controller further configured to monitor a status of the communication system for the critical disruption, the controller located inside the robot;
a robotic energy source configured to provide energy to the robot; and
a charging station configured to operably connect to the energy source, the charging station further configured to replenish the energy source,
wherein the controller is further configured to determine if the robot's energy level is less than the critical energy level,
wherein the controller is further configured, upon determining that the robot's energy level is less than the critical energy level, to send the replenishment message,
wherein the controller sends the replenishment message to a user.

7. A system to prevent depletion of a robotic energy source, comprising:
a mobile robot;
a server operably connected to the robot via a communication system, the server configured to manage the robot, the server further configured to monitor an energy level of the robot for a sign of low energy, wherein the low-energy sign comprises a critical disruption of the communication system, the server further configured to send a robot that shows the low-energy sign a replenishment message ordering the robot to do one or more of reduce its activity and shut down;
a controller operably connected to the robot, the controller operably connected to the server, the controller configured to control the robot, the controller further configured to monitor a status of the communication system for the critical disruption, the controller located inside the robot;
a robotic energy source configured to provide energy to the robot; and
a charging station configured to operably connect to the energy source, the charging station further configured to replenish the energy source,
wherein the controller is further configured to determine if the robot's energy level is less than the critical energy level,
wherein the controller is further configured, upon determining that the robot's energy level is less than the critical energy level, to send the replenishment message,
wherein the controller sends the replenishment message to a second robot in a position to assist the mobile robot in charging.

8. A method to prevent depletion of a robotic energy source, comprising:
- monitoring, by a server operably connected to a mobile robot via a communication system, the server configured to manage the robot, an energy level of an energy source configured to provide energy to the robot;
- finding, by the server, a critical energy level comprising an energy level at which replenishment of the energy source begins;
- determining, by the server, a low-energy sign indicating that the robot has low energy, the low-energy sign comprising a critical disruption of the communication system;
- allowing, by the server, monitoring, by a controller operably connected to the robot, the controller operably connected to the server, of a status of the communication system for the critical disruption, the controller configured to control the robot, the controller further configured to monitor an energy level of the robot, the controller located inside the robot; and
- sending, by the server, based on the low energy sign, a replenishment message to the controller, the controller operably connected to the server, the replenishment message ordering the robot to do one or more of reduce its activity and shut down,
- further comprising a step, performed after the allowing step and before the sending step, of determining, by the server, a charging station to which the replenishment message sends the robot.

9. A method to prevent depletion of a robotic energy source, comprising:
- monitoring, by a server operably connected to a mobile robot via a communication system, the server configured to manage the robot, an energy level of an energy source configured to provide energy to the robot;
- finding, by the server, a critical energy level comprising an energy level at which replenishment of the energy source begins;
- determining, by the server, a low-energy sign indicating that the robot has low energy, the low-energy sign comprising a critical disruption of the communication system;
- allowing, by the server, monitoring, by a controller operably connected to the robot, the controller operably connected to the server, of a status of the communication system for the critical disruption, the controller configured to control the robot, the controller further configured to monitor an energy level of the robot, the controller located inside the robot; and
- sending, by the server, based on the low energy sign, a replenishment message to the controller, the controller operably connected to the server, the replenishment message ordering the robot to do one or more of reduce its activity and shut down,
- further comprising a step, performed after the allowing step and before the sending step, of determining, by the server, a charging station to which the replenishment message sends the robot,
- wherein the sending step further comprises sending the replenishment message to the charging station.

10. A method to prevent depletion of a robotic energy source, comprising:
- monitoring, by a server operably connected to a mobile robot via a communication system, the server configured to manage the robot, an energy level of an energy source configured to provide energy to the robot;
- finding, by the server, a critical energy level comprising an energy level at which replenishment of the energy source begins;
- determining, by the server, a low-energy sign indicating that the robot has low energy, the low-energy sign comprising a critical disruption of the communication system;
- allowing, by the server, monitoring, by a controller operably connected to the robot, the controller operably connected to the server, of a status of the communication system for the critical disruption, the controller configured to control the robot, the controller further configured to monitor an energy level of the robot, the controller located inside the robot; and
- sending, by the server, based on the low energy sign, a replenishment message to the controller, the controller operably connected to the server, the replenishment message ordering the robot to do one or more of reduce its activity and shut down,
- further comprising a step, performed after the allowing step and before the sending step, of determining, by the server, a charging station to which the replenishment message sends the robot,
- wherein the replenishment message orders the robot's energy to be replenished at the charging station.

11. A method to prevent depletion of a robotic energy source, comprising:
- monitoring, by a server operably connected to a mobile robot via a communication system, the server configured to manage the robot, an energy level of an energy source configured to provide energy to the robot;
- finding, by the server, a critical energy level comprising an energy level at which replenishment of the energy source begins;
- determining, by the server, a low-energy sign indicating that the robot has low energy, the low-energy sign comprising a critical disruption of the communication system;
- allowing, by the server, monitoring, by a controller operably connected to the robot, the controller operably connected to the server, of a status of the communication system for the critical disruption, the controller configured to control the robot, the controller further configured to monitor an energy level of the robot, the controller located inside the robot; and
- sending, by the server, based on the low energy sign, a replenishment message to the controller, the controller operably connected to the server, the replenishment message ordering the robot to do one or more of reduce its activity and shut down,
- further comprising a step, performed after the allowing step and before the sending step, of determining, by the server, a charging station to which the replenishment message sends the robot,
- wherein the sending step further comprises sending the replenishment message to a user.

12. A method to prevent depletion of a robotic energy source, comprising:
- monitoring, by a server operably connected to a mobile robot via a communication system, the server configured to manage the robot, an energy level of an energy source configured to provide energy to the robot;
- finding, by the server, a critical energy level comprising an energy level at which replenishment of the energy source begins;

determining, by the server, a low-energy sign indicating that the robot has low energy, the low-energy sign comprising a critical disruption of the communication system;

allowing, by the server, monitoring, by a controller operably connected to the robot, the controller operably connected to the server, of a status of the communication system for the critical disruption, the controller configured to control the robot, the controller further configured to monitor an energy level of the robot, the controller located inside the robot; and sending, by the server, based on the low energy sign, a replenishment message to the controller, the controller operably connected to the server, the replenishment message ordering the robot to do one or more of reduce its activity and shut down, further comprising a step, performed after the allowing step and before the sending step, of determining, by the server, a charging station to which the replenishment message sends the robot, wherein the sending step further comprises sending the replenishment message to a second robot in a position to assist the mobile robot in charging.

13. A method to prevent depletion of a robotic energy source, comprising:

monitoring, by a controller operably connected to a mobile robot, the controller configured to control the robot, the controller located inside the robot, an energy level of an energy source configured to provide energy to the robot;

receiving, by the controller, a critical energy level comprising an energy level at which replenishment of the energy source begins;

receiving, by the controller, from a server operably connected to the controller, the server operably connected to the robot via a communication system, the server configured to manage the robot, a low-energy sign indicating that the robot has low energy, the low-energy sign comprising a critical disruption of the communication system;

monitoring, by the controller, a status of the communication system for the critical disruption;

deciding, by the controller, based on the low energy sign, to send a replenishment message ordering the robot to do one or more of reduce its activity and shut down; and sending, by the controller, to the robot, the replenishment message, wherein the method further comprises an additional step, performed after the step of receiving the replenishment message and before the sending step, of:

determining, by the controller, a charging station to which the replenishment message sends the robot.

14. A method to prevent depletion of a robotic energy source, comprising:

monitoring, by a controller operably connected to a mobile robot, the controller configured to control the robot, the controller located inside the robot, an energy level of an energy source configured to provide energy to the robot;

receiving, by the controller, a critical energy level comprising an energy level at which replenishment of the energy source begins;

receiving, by the controller, from a server operably connected to the controller, the server operably connected to the robot via a communication system, the server configured to manage the robot, a low-energy sign indicating that the robot has low energy, the low-energy sign comprising a critical disruption of the communication system;

monitoring, by the controller, a status of the communication system for the critical disruption;

deciding, by the controller, based on the low energy sign, to send a replenishment message ordering the robot to do one or more of reduce its activity and shut down; and sending, by the controller, to the robot, the replenishment message, wherein the method comprises an additional step, performed after the sending step, of:

transmitting, by the controller, the replenishment message to a charging station configured to replenish the energy source.

15. A method to prevent depletion of a robotic energy source, comprising:

monitoring, by a controller operably connected to a mobile robot, the controller configured to control the robot, the controller located inside the robot, an energy level of an energy source configured to provide energy to the robot;

receiving, by the controller, a critical energy level comprising an energy level at which replenishment of the energy source begins;

receiving, by the controller, from a server operably connected to the controller, the server operably connected to the robot via a communication system, the server configured to manage the robot, a low-energy sign indicating that the robot has low energy, the low-energy sign comprising a critical disruption of the communication system;

monitoring, by the controller, a status of the communication system for the critical disruption;

deciding, by the controller, based on the low energy sign, to send a replenishment message ordering the robot to do one or more of reduce its activity and shut down; and sending, by the controller, to the robot, the replenishment message, wherein the method comprises an additional step, performed after the sending step, of:

transmitting the replenishment message to a user.

16. A method to prevent depletion of a robotic energy source, comprising:

monitoring, by a controller operably connected to a mobile robot, the controller configured to control the robot, the controller located inside the robot, an energy level of an energy source configured to provide energy to the robot;

receiving, by the controller, a critical energy level comprising an energy level at which replenishment of the energy source begins;

receiving, by the controller, from a server operably connected to the controller, the server operably connected to the robot via a communication system, the server configured to manage the robot, a low-energy sign indicating that the robot has low energy, the low-energy sign comprising a critical disruption of the communication system;

monitoring, by the controller, a status of the communication system for the critical disruption;

deciding, by the controller, based on the low energy sign, to send a replenishment message ordering the robot to do one or more of reduce its activity and shut down; and sending, by the controller, to the robot, the replenishment message, wherein the method comprises an additional step, performed after the sending step, of:

transmitting the replenishment message to a second robot in a position to assist the mobile robot in charging.

17. A method to prevent depletion of a robotic energy source, comprising:

monitoring, by a controller operably connected to a mobile robot, the controller configured to control the robot, the controller located inside the robot, an energy level of an energy source configured to provide energy to the robot;

receiving, by the controller, a critical energy level comprising an energy level at which replenishment of the energy source begins;

receiving, by the controller, from a server operably connected to the controller, the server operably connected to the robot via a communication system, the server configured to manage the robot, a low-energy sign indicating that the robot has low energy, the low-energy sign comprising a critical disruption of the communication system;

monitoring, by the controller, a status of the communication system for the critical disruption;

deciding, by the controller, based on the low energy sign, to send a replenishment message ordering the robot to do one or more of reduce its activity and shut down; and sending, by the controller, to the robot, the replenishment message, wherein the replenishment message orders the robot's energy to be replenished at a charging station configured to operably connect to the energy source.

* * * * *